United States Patent [19]

Sunstein

[11] Patent Number: 4,759,631

[45] Date of Patent: Jul. 26, 1988

[54] SYSTEM FOR TRANSMISSION LOSS COMPARISON

[75] Inventor: Drew E. Sunstein, Hollis, N.H.

[73] Assignee: Circuits and Systems, Inc., Amherst, N.H.

[21] Appl. No.: 912,953

[22] Filed: Sep. 29, 1986

[51] Int. Cl.$^4$ ............................................. G01N 21/00
[52] U.S. Cl. ..................................... 356/435; 250/565; 250/575
[58] Field of Search ................ 356/435, 436; 250/565, 250/575, 345

[56] References Cited

U.S. PATENT DOCUMENTS 3,740,555  6/1973  Schaefer ............................... 250/345
4,095,098  6/1978  Looper .................................. 250/575
4,350,441  9/1982  Wicienski ............................. 250/565

Primary Examiner—Bruce C. Anderson
Attorney, Agent, or Firm—Bromberg, Sunstein & Casselman

[57] ABSTRACT

A system for transmission loss comparison permits enhanced accuracy over a wider dynamic range by providing a reference channel including a transmitter, receiver, and transmission path therebetween, and a sample channel, including a transmitter, receiver, and transmission path therebetween. A feedback arrangement is provided for adjusting the outputs of both of the reference and sample transmitters in relation to the signal output of the reference receiver, so as to produce a desired signal level of the reference receiver's output over a given dynamic range, so as to compensate for loss over the reference transmission path. In this way, a comparator connected to the outputs of the two receivers receives inputs that are compensated for effects of losses over the reference transmission path.

16 Claims, 2 Drawing Sheets

SYSTEM FOR TRANSMISSION LOSS COMPARISON

DESCRIPTION

1. Field of the Invention

The present invention pertains to systems for comparing transmissions losses, especially through transmission paths that may be optical, although the invention has application to other types of transmission paths.

2. Background Art

Systems for comparing transmission losses through alternative paths are well known in the art. Where the transmission paths are optical, it is common to have a pair of light sources, and a pair of light receivers, each of which monitors the light transmitted through a given path from one of the light sources. However, prior art devices suffer from difficulty in making comparisons of relative transmission loss over a wide dynamic range. Moreover, the prior typically requires close matching of components constituting the light sources and light receivers, especially when the relative transmission loss must be compared over a wide dynamic range.

DISCLOSURE OF THE INVENTION

The present invention permits enhanced accuracy over a wider dynamic range by providing a system having a reference channel including a transmitter, receiver, and transmission path therebetween, and a sample channel, including a transmitter, receiver, and transmission path therebetween. A feedback arrangement is provided for adjusting the outputs of both of the reference and sample transmitters in relation to the signal output of the reference receiver, so as to produce a desired signal level of the reference receiver's output over a given dynamic range, so as to compensate for loss over the reference transmission path. In this way, a comparator connected to the outputs of the two receivers receives inputs that are compensated for effects of losses over the reference transmission path.

BRIEF DESCRIPTION OF THE DRAWINGS

These and other objects and features of the invention will be more readily understood in reference to the following description taken with the accompanying drawings in which.

DESCRIPTION OF SPECIFIC EMBODIMENTS

Figure 1:
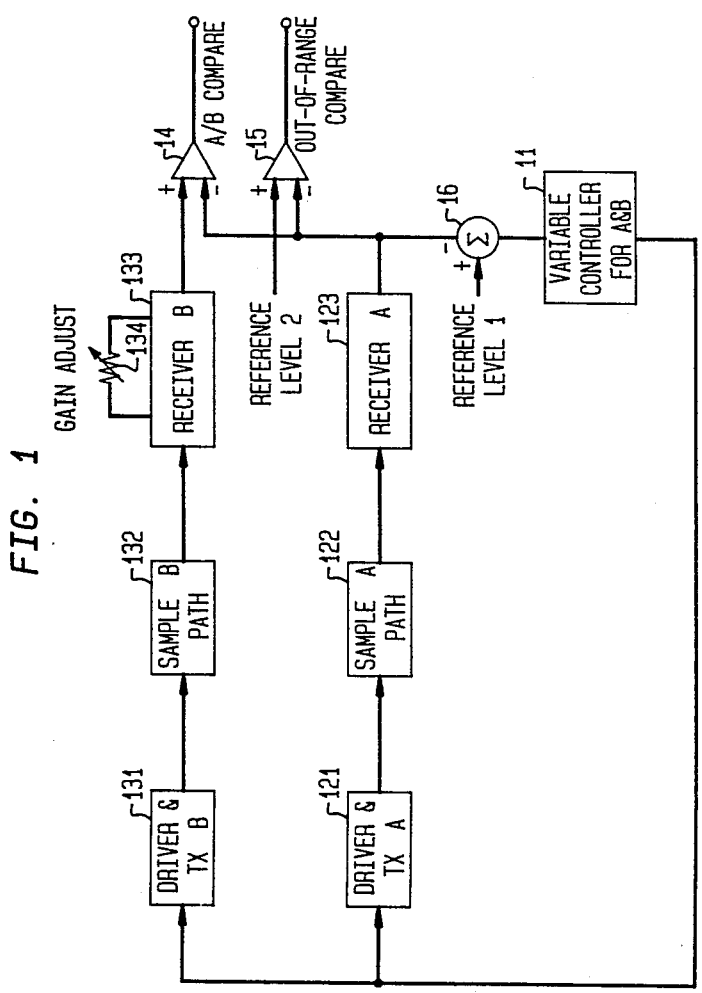
FIG. 1 is a block diagram of an embodiment of the present invention.

A simplified block diagram of one embodiment of the invention is shown in FIG. 1. As shown, the system includes two transmitter and receiver channels with the path loss to be measured between the transmitter and the receiver in each channel, some control circuitry to adjust the level of the transmitters for both channels, and some comparison circuitry after the receivers. The channels are identified in FIG. 1 as "A" and "B". In practice, channel A may include a reference in the transmission path, and is sometimes referred to as the "reference" channel. Channel B may include a sample in the transmission path, and is sometimes referred to herein as the "sample" channel. In detail, describing the A channel first:

Channel A consists of a driver and transmitter 121 which has a signal (signal A) received by receiver A 123. In between the transmitter and the receiver is a reference path loss 122 in the diagram called sample A, TX path loss. The output of receiver A is compared in summer 16 to reference level 1, and the difference between the reference level 1 and the output of receiver A goes into controller 11 for A and B, which controls the level of the drive signal of both the channel A transmitter and channel B transmitter. This feedback circuit must be analyzed for gain and phase stability and designed to provide stable performance. The stability analysis and compensation techniques are well known in the art.

The output of receiver A is compared to two other levels. One level (by comparator 14) is the corresponding output of receiver B in the B channel, and the other comparison level is the out-of-range comparison, reference level 2 (by comparator 15).

The B channel includes a driver and transmitter 131, receiver B 133, and a channel B transmission path 132 with some loss. The system compares this loss with the loss in the channel A transmission path. The channel B transmitter and its associated driver is designed to have a control transfer characteristic similar to the driver and transmitter in channel A. These two transmitters do not have to match exactly, and may in fact have different gain characteristics; however, their transfer functions from the control input to the transmitted power output should be of the same general shape and differ only by the gain term.

The channel B receiver is shown with a gain adjustment 134. This adjustment varies the gain of channel B, so that the output of channel B matches the output of channel A when the same path loss is inserted in both channels.

For part of the measurement range of the device, the feedback control circuitry on channel A keeps the received power on both channels A and B on a constant level (assuming channel B transmission loss is the same as channel A transmission loss). Therefore, the receivers in channel A and channel B do not, per se, have to match each other at all. Only the gains of the full channels A and B, taking into account the transfer functions of both the transmitters and the receivers, must match at the desired operating point of the system.

For wider range applications, the characteristics of receiver B should match those of receiver A. This situation occurs when the path loss in channel A and channel B are larger than the feedback loop of channel A can accommodate. When this occurs, the transmitted power on channel A and channel B are at their maximum levels and the detected power from receiver A drops below reference level 1. (If the comparison path loss in channel B is similarly great, then the detected level in receiver B also drops.) The comparison circuitry 14 for the A/B comparison is therefore designed to accommodate comparisons both at the reference level and at receiver outputs that are less than the reference level. Depending on the match of the receivers, and the quality of the comparison circuits, the instrument can continue to make valid comparisons at transmission path losses that cause the receiver A output to drop significantly below the level of reference level 1.

At very high transmission losses, the receivers for channel A and channel B will either no longer match, or the comparison circuitry will not be able to readily distinguish between the two power levels. At some power level somewhat greater than this point, a reference level 2 is established and forms an input to comparator 15 to this reference level with the channel A receiver output; the output of comparator 15 establishes when the system is out of measurement range.

Figure 2:
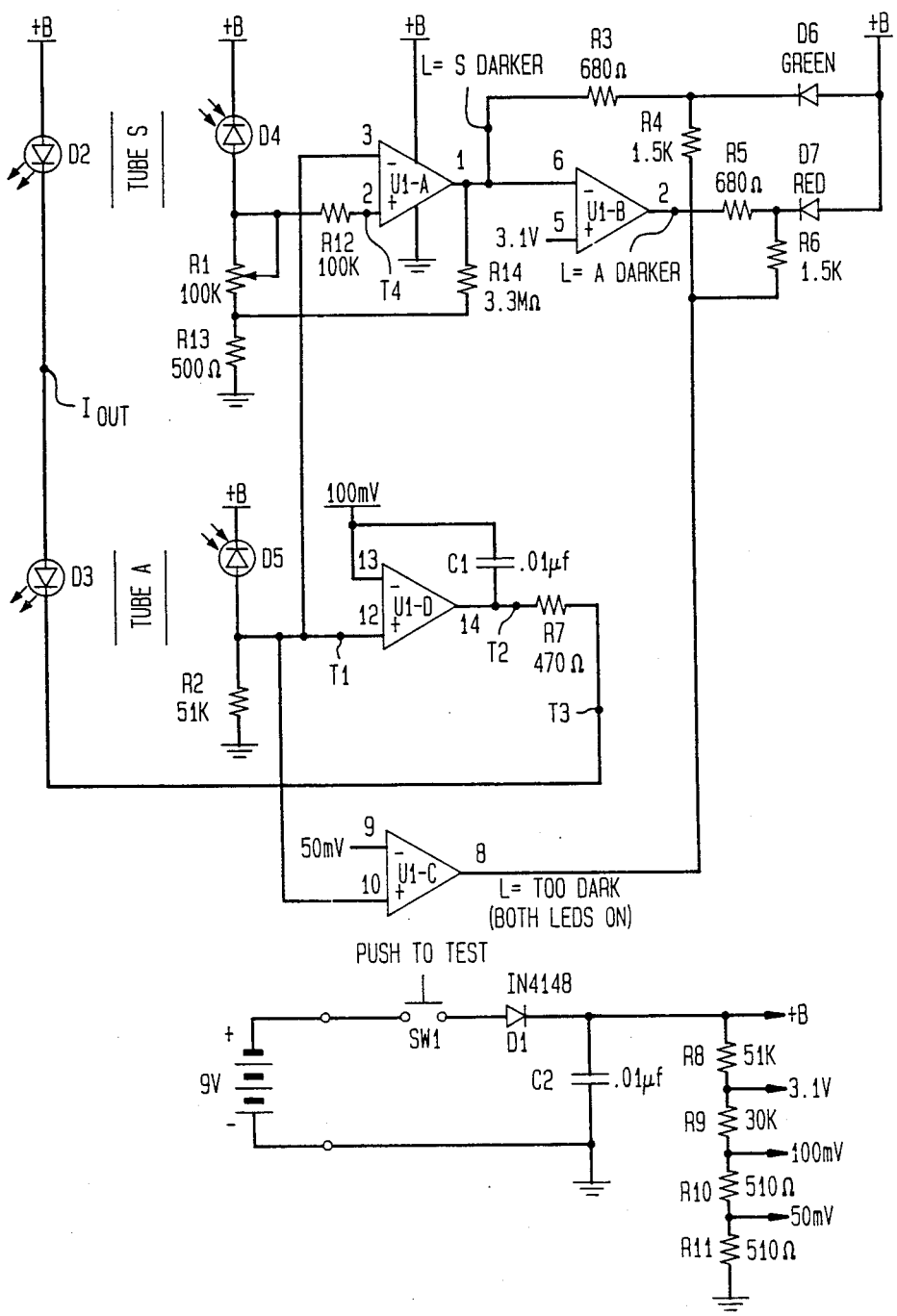
FIG. 2 is a schematic diagram of a preferred embodiment of the present invention.

A preferred embodiment of the invention is shown in FIG. 2. This embodiment provides a system for comparing the optical density, i.e., the transmission coefficient, of different liquids in two test tubes. The system compares the optical density of the two samples simultaneously because the optical density varies with time for the two solutions being measured. Therefore, a valid comparison must be made by measuring the optical density of both tubes simultaneously. The transmitters are high power, red LEDs D2 and D3. The receivers are photodiodes D4 and D5, sensitive to the wavelength being transmitted by the LEDs. In the transmission path between D3 and D5 is the sample in tube A and in the transmission path between D2 and D4 is the sample in tube S. Both transmission paths include losses due not merely to the samples tubes A and S, but also due to other characteristics of the optical path, including the optic design and test tube geometry.

In this embodiment, tube A lies in what is described with respect to FIG. 1 as the reference channel, and tube S lies in what has been described above as the sample channel. The LEDs D2 and D3 are powered between +B and the output of section D of quad op amp LM324A. This op amp is configured so as to provide 100 millivolts (reference level 1 in FIG. 1) on one input and the reference receiver output on the other input. In this way, the feedback loop over line T3 causes LEDs D3 and D2 to glow brighter when necessary, owing to transmission losses in tube A, so as to tend to provide a constant 100 millivolt level on line T1, the output of photodiode D5.

The output of D5 is also in input to the comparator constituting section A of the quad op amp LM324A, which is configured as a comparator. Effectively, the other input to the section A comparator is the output of photodiode D4. However, the output of D4 is varied by changing its load resistance via potentiometer R1, so that the relative gain of the sample channel in comparison to the reference channel may be adjusted to match at some desired transmission loss through tube A and tube S (when, for example, both tubes are filled with plain water). R12 is used to compensate for bias currents in section A of the LM324A device. R14 provides modest positive feedback to the top of R13, so that the comparative output is more decisive. The section B of LM324A is configured as an inverter, so that the green LED D6 is illuminated in the event that the output of the comparator in section A is low (corresponding to more light received through the reference channel, i.e., a darker sample than reference) and red LED D7 is illuminated in the reverse situation (lighter sample).

If it happens that the reference sample in tube A is so dark that the power output of each of LEDs D3 and D2 are at maximum, then, it may be that the voltage at T1 drops below 100 millivolts. For a significant amount of distance below this reference level, the system will continue to make valid comparisons, since the inputs to the comparator in section A are still the outputs of photodiodes D4 and D5.

When the output of the photodiode D5 has dropped below some threshold value, here 50 millivolts, one may decide that the system's comparison is outside a desired accuracy. Accordingly, section C of the LM324A is configured as a comparator, in which one input is the output of photodiode D5 and the other is 50 millivolts. The output of this comparator is arranged so as to cause the illumination of both LEDs D6 and D7 when the photodiode D5 output falls below 50 millivolts.

Other components in the schematic will be readily understood by one skilled in the art. D1 is present to provide protection in the event of accidental placement of reverse polarity of the 9 volt battery. C1 serves as a bypass capacitor. R7 provides current limiting and gain stability in the feedback loop including diode D3.

What is claimed is:

1. A system for determining relative transmission loss over a reference path and a sample path, the system comprising:
   reference and sample transmitters, each having an output signal and a transfer characteristic, transmitting over reference and sample paths respectively, to reference and sample receivers respectively, each receiver having a signal output;
   means for comparing the output of the reference receiver with a reference level quantity;
   feedback means for adjusting the outputs of both of the reference and sample transmitters in relation to the result of the comparison of the reference receiver output with the reference level quantity, so as to produce a desired signal level of the reference receiver output, so as to compensate for loss over the reference transmission path;
   comparator means, having an output, and having a pair of inputs connected to the outputs of the reference and sample receivers, for comparing the outputs of the reference and sample receivers;
   whereby the comparator means has inputs that are compensated for effects of transmission losses over the reference path.

2. A system according to claim 1, wherein the reference and sample transmitters have transfer characteristics that are substantially matched.

3. A system according to claim 1, wherein each associated transmitter, path, and receiver constitute collectively a channel, the system therefore having a reference channel and a sample channel, each channel having a gain, the system further comprising:
   calibration means for matching the gains of the reference and sample channels for a fixed transmission loss in each of the reference and sample channels.

4. A system according to claim 2, wherein each associated transmitter, path, and receiver constitute collectively a channel, the system therefore having a reference channel and a sample channel, each channel having a gain, the system further comprising:
   calibration means for matching the gains of the reference and sample channels for a fixed transmission loss in each of the reference and sample channels.

5. A system according to claim 1, further comprising:
   range limit means for determining when the reference receiver output signal is below a threshold, lying outside the first dynamic range, at which point the comparator means output may lack desired accuracy.

6. A system according to claim 2, further comprising:
   range limit means for determining when the reference receiver output signal is below a threshold, lying outside the first dynamic range, at which point the comparator means output may lack desired accuracy.

7. A system according to claim 3, further comprising:

range limit means for determining when the reference receiver output signal is below a threshold, lying outside the first dynamic range, at which point the comparator means output may lack desired accuracy.

8. A system according to claim 4, further comprising:
range limit means for determining when the reference receiver output signal is below a threshold, lying outside the first dynamic range, at which point the comparator means output may lack desired accuracy.

9. A system according to claim 1, wherein the transmitters are light sources and the paths are optical.

10. A system according to claim 2, wherein the transmitters are light sources and the paths are optical.

11. A system according to claim 3, wherein the transmitters are light sources and the paths are optical.

12. A system according to claim 4, wherein the transmitters are light sources and the paths are optical.

13. A system according to claim 5, wherein the transmitters are light sources and the paths are optical.

14. A system according to claim 6, wherein the transmitters are light sources and the paths are optical.

15. A system according to claim 7, wherein the transmitters are light sources and the paths are optical.

16. A system according to claim 8, wherein the transmitters are light sources and the paths are optical.

* * * * *